Oct. 31, 1950 H. A. MILOCHE 2,528,161

SIGNAL CODE TRANSLATOR

Filed Nov. 8, 1946 2 Sheets-Sheet 1

INVENTOR
H. A. MILOCHE
BY J. W. Schmied
ATTORNEY

INVENTOR
H. A. MILOCHE
BY J. W. Schmied
ATTORNEY

Patented Oct. 31, 1950

2,528,161

UNITED STATES PATENT OFFICE 2,528,161

SIGNAL CODE TRANSLATOR

Herman A. Miloche, Teaneck, N. J., assignor to Bell Telephone Laboratories, Incorporated, New York, N. Y., a corporation of New York Application November 8, 1946, Serial No. 708,575

12 Claims. (Cl. 179—18)

This invention relates to a card translating arrangement and more particularly to a translating arrangement employing a doubly selective process to choose a particular card.

One of the features of the present invention is a device which will convert a dialed code number into a distinctly different code suitable for accomplishing the proper telephone switching functions.

Another feature of the subject invention is a card translator which will be comparatively simple in construction, easy in operation, compact in form and inexpensive to build.

A further feature of the present invention is a card translator which has its cards arranged in sets containing a number of cards in a set and in which a double selection takes place, first a set and then a card in the set being selected.

Still another feature of the present invention is a card translator in which individual cards may be easily replaced.

Another feature of the present invention is a card translator in which a distinctive output registration is obtained for each card by means of a pattern of notches cut into the top edges of the cards.

Other advantages of the invention will be apparent from the following detailed description when taken in conjunction with the accompanying drawings.

In accordance with the subject invention, a card translator is contemplated in which a plurality of cards are grouped in sets containing a number of cards in each set. The sets are so arranged that a set will be chosen which corresponds to the first two dialed numbers of a code number. Thus, if the code number dialed should be 438, the 43rd set of cards will be chosen by the action of appropriate relays and magnets; likewise, if the code number desired should be 956, relays corresponding to the numbers 90 and 5 would select the 95th set of cards. As a further step, the 8th card in the 43rd set would be selected so as to correspond numerically to the third digit in the code number 438, and the 6th card in the 95th set would be chosen as the appropriate card for the number 956.

It is proposed that each card in a set have one tab, this tab to extend below the bottom surface of the card at a point different from all of the other cards in the set, such that when the cards of the set are assembled a number of tabs will appear equal to the number of cards, with each card having its tab at a succeeding point along the bottom edge. An individual yoke lies below each of the tabs in a set and a pin lies below each yoke; however, the pin is sufficiently misaligned with the yoke and tab to prevent any force on the pins from being transmitted to the yoke. A selecting bar lies below each pin in alignment with the yokes and tabs. In order for a particular set to be selected, the pins must be moved into alignment with the yokes and selecting bars. This is accomplished by connecting all of the pins in a set to a shaft which has a magnetic core at its end. When a set is chosen by the input registers, a magnet is energized which operates to attract the magnetic core and thus move the pins into alignment with the yokes and selecting bars. By moving the pins in a set into alignment with their yokes and selecting bars, each card in the set is made available to be raised by an upward movement of its associated selecting bar. Each of the selecting bars is associated with a separate magnet and a particular magnet operates on its selecting bar so as to raise the selecting bar and the yoke and pin lying above the selecting bar. Thus, the particular card whose tab is lying above the yoke that is being raised will be raised also.

The top of each card has positions for a plurality of notches but only two notches are actually made in each card, the pair of notches being different for each card. A yoke having a male latch portion is located above each of the possible positions for notches and a contact rod having the female portion to the male latch portion is located above each yoke. When a card is raised, it raises all of the yokes except those lying above notches sufficiently to have the raised yokes engage their associated contact bars and prevent them from operating. At the same time, force is exerted axially on all of the contact rods, tending to move them towards output contacts, which will operate under pressure from the contact rods. However, since the raised yokes restrain their associated selecting bars from moving by the locking action of the latch portions on the yokes and contact rods, only those contact rods will move which lie above notches on the selected card, and thus a distinctive code dependent upon the pattern of the notches in the selected card will be set up on the output contacts.

Referring now to the accompanying drawings.

Figure 1:
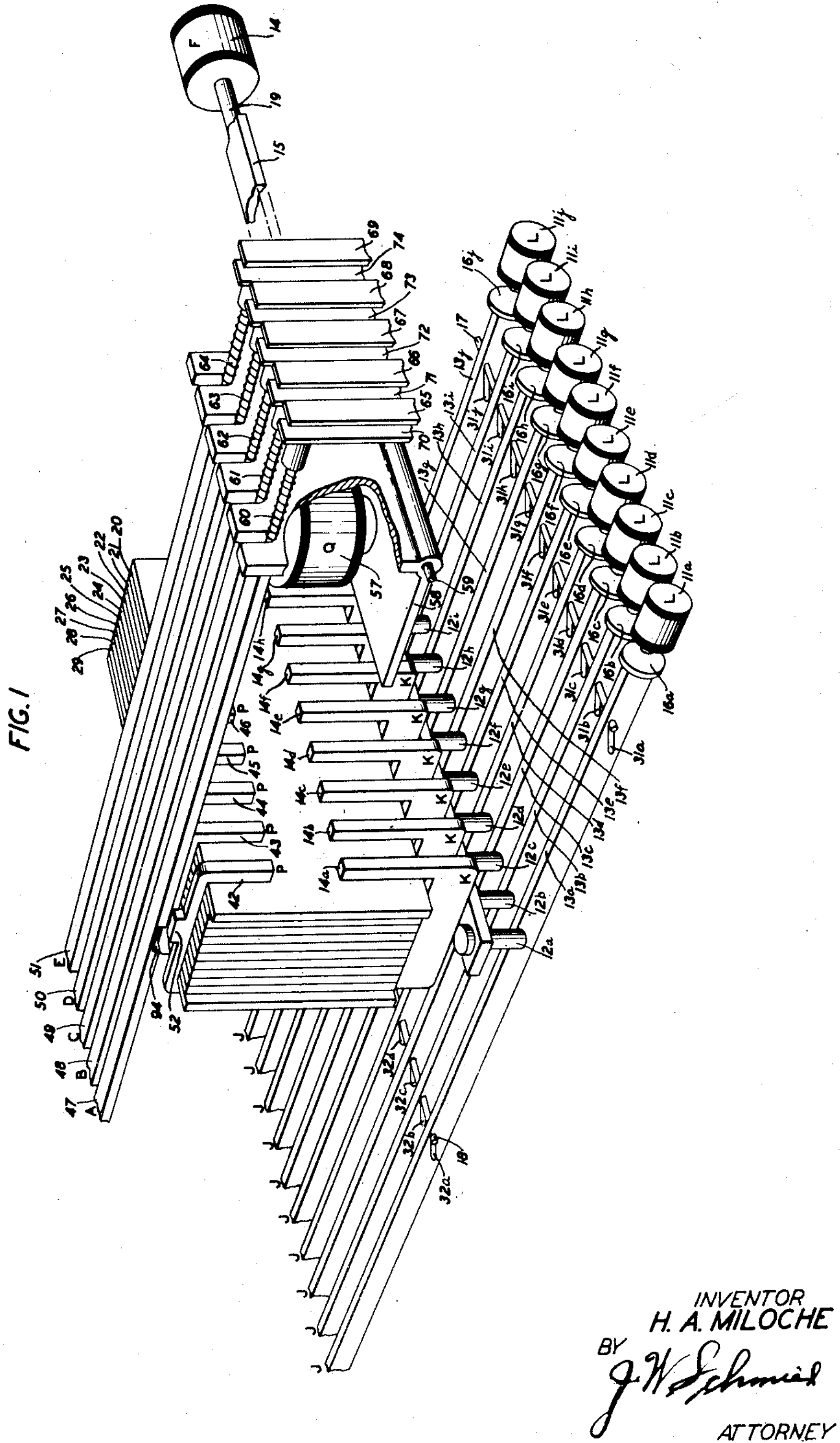
Fig. 1 is a perspective view of the mechanical features of the invention.

In Fig. 1, to which reference is now had, there is shown in perspective the mechanical features associated with one set of cards. These comprise the cards 20 through 29, inclusive, and the yokes 14*a* through 14*j*, inclusive, pins 12*a* through 12*j*, inclusive, and rods 13*a* through 13*j*, inclusive, all of which assist in selecting a particular card. As may be seen from Fig. 2, these cards are rectangular in shape, with each card having a tab which extends from its bottom edge at a point different from all of the other cards in the set. Thus, the card 20 may be considered to have the tab 30, the card 21 to have the tab 31 to the right of tab 30, the card 22 to have the tab 32 to the right of both the tabs 30 and 31, and so on, with the card 29 having the tab 39 to the right of all the other tabs. One of the yokes 14*a* through 14*j*, inclusive, lies under each tab and thus serves as the means whereby a particular card is selected from the set. In the normal position, one of the pins 12*a* through 12*j*, inclusive, lies under each yoke, but to the left of the corresponding yoke such that no mechanical contact is maintained between the pin and its corresponding yoke, as may be seen in both Figs. 1 and 2. However, the pins 12*a* through 12*j*, inclusive, are all attached to the same shaft 15, causing them all to move into position under their corresponding yokes 14*a* through 14*j* inclusive when the shaft 15 moves to the right. The movement to the right of the shaft 15 resulting from the actuation of the magnet 14, which attracts a magnetic core 19, attached to the shaft 15. Thus, when the magnet 14 is actuated and the shaft 15 and attached pins 12*a* through 12*j* inclusive move to the right, a particular set of cards is selected by reason that only the cards in that set are able to be raised by their corresponding yokes. It should be noted that, although ten cards are shown in a set to correspond to all the possible values for a digit in the present telephone dial system, a different number of cards might be used to comprise a set. Additionally, the number of yokes, pins and selecting bars associated with the set would accordingly have to be changed to correspond to the number of cards in the set.

Whereas selection of the set of cards shown is attained by exciting the magnet 14, selection of a particular card in the set is attained by actuating one of the magnets 11*a* through 11*j*, inclusive, as shown in Fig. 1. Each of these magnets is aligned with a corresponding bar 13*a* through 13*j* inclusive, but is not attached to the rod. Instead, one of the plates 16*a* through 16*j*, inclusive, is attached to each bar at a point close enough to be attracted toward that magnet which is aligned with the bar, when the magnet is actuated. The bars 13*a* through 13*j*, inclusive, may be supported by two shafts 17 and 18 which lie in the slots 31*a* through 31*j*, inclusive, and 32*a* through 32*j*, inclusive, in the bars. These slots may extend upward as they extend along the bar such that when the bar is attracted towards its corresponding magnet, it will move in an upward direction at the same time that it moves towards the magnet. Thus, since the pins in the selected set lie directly in line with the selecting bars and the yokes, the movement upward of a bar will force the associated pin and yoke to move upward also. For example, if the magnet 11*d* should be energized so as to attract the plate 16*d* and, along with it the bar 13*d*, the bar 13*d* will move upward at the same time as it moves towards the magnet 13*d* and will push the pin 12*d* and the yoke 14*d* up with it. Since the card 23 has its tab lying directly over the yoke 14*d*, the card 23 will be raised and thus be selected from the other cards in the set, as may be seen from Figs. 1 and 2. The electrical circuits required to energize the magnet 11*d* will be described in more detail in connection with the discussion of Fig. 3.

Figure 2:
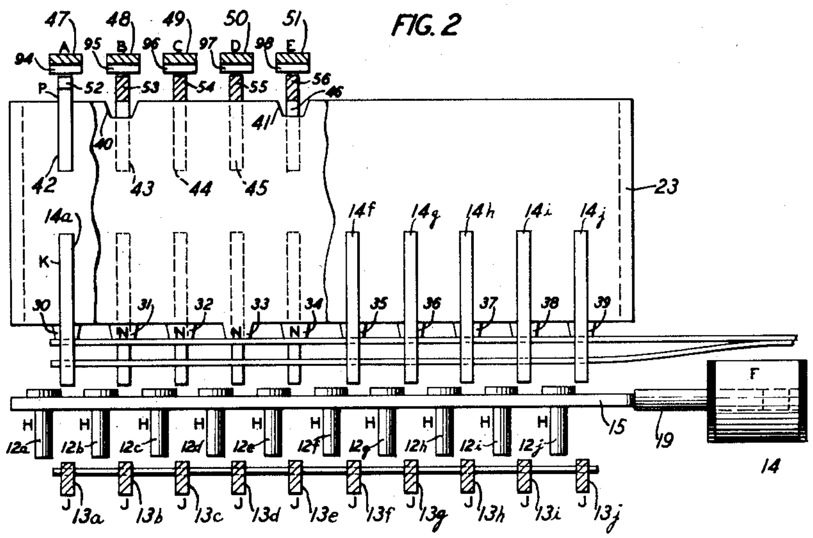
Fig. 2 is a side view of the apparatus shown in Fig. 1.

Although a particular card in a selected set is raised in Figs. 1 and 2 by means of the distinctive positioning of a tab along the bottom edge of the card, the same result would be obtained if notches were cut in the card at all the positions where tabs appear in the set shown in Fig. 1, except for that position where the particular card now has a tab. Thus, when a selecting bar was raised, all of the cards but one would have notched above the raised bar and accordingly only one card would be raised.

Whereas a particular card in the selective set is raised as a result of the positioning of a tab along its bottom edge, determination of the code to be transmitted is made by means of notches cut into the tops of the cards. Five possible positions for notches are made available along the tops of the cards of each set, with each card having two notches distinctively arranged with respect to all of the cards in the set. Thus, by using a "two-out-of-five" code, ten different combinations of notches may be obtained, with a different combination being available for each card in the set. Instead of a "two-out-of-five" code, a three-out-of-five code might be used to obtain ten possible variations. Or a two-out-of-six code might be used so that if the cards in a set were increased above ten, combinations not used for the first ten cards would be available for the additional cards, since a two-out-of-six combination yields fifteen variations. In other words, any code may be used for the notches which will give a distinctive pattern for each card in a set. Thus, for example, if the two-out-of-five code is considered, the card 23, as shown in Fig. 2, has the notches 40 and 41 cut out of the top of the card at the second and fifth positions along the card.

The yokes 42 through 46, inclusive, are supported by the top edges of the cards in the set, a different yoke lying at each of the five possible positions for the notches. Fig. 2, for example, shows the yokes 43 and 46 lying directly over the notches 40 and 41 in the card 23. Each of the yokes 42 through 46, inclusive, has a male latch portion which extends from the yoke towards a rod which is positioned above the yoke. Fig. 1 shows the latch portion 52 of the yoke 42, this latch portion fitting into the corresponding female latch 94 of the rod 47 when the yoke 42 is raised, thereby locking the rod 47 and preventing it from moving in a horizontal direction perpendicular to the cards. In Fig. 2, the male latch portions 52 through 56, inclusive, of the yokes 42 through 46, inclusive, are represented by the cross-hatched upper portions of the yokes. Fig. 2 also shows the female latches 94 through 98, inclusive, in the rods 47 through 51, inclusive, these female latches being engaged by the corresponding male latches in the yokes when the yokes are raised. Thus, when a particular card is raised, all of the yokes above the card will be raised except for those lying above the two portions where the card is notched, and thus all of the rods except for those two lying above the positions where the card is notched will be engaged. In the representation shown by Fig. 2, when the card 23 is raised, the yokes 42, 44 and 45 will be raised so as to engage and lock the rods 47, 49 and 50. Thus, only the rods 48 and 51 will still be free to transmit coded information. It should be noted that although only five yokes and five contact rods are shown in Figs. 1 and 2, a different number would be shown if the number of positions for notches on each card were changed.

Although notches along the top edge of the card are shown in Figs. 1 and 2 as the means of obtaining a distinctive output registration, the same effect might be obtained with tabs. Thus, considering the card 23 in Fig. 2, tabs might appear along the top edge of the card below the yokes 42, 44 and 45 while no tabs would appear below the yokes 43 and 46. Thus when the card 23 was raised, the tabs would push the yokes 42, 44 and 45 up to engage the rods 47, 49 and 50 while the rods 48 and 51 would still be free for further movement.

Coded information is transmitted when the magnet 57 is excited. As shown in Fig. 1, this magnet is placed above a table 58 which is composed of magnetic material and which is free to rotate about the shaft 59. Thus, when the magnet 57 is energized, the table 58 is attracted towards the magnet 57 and rotates in a clockwise direction about the shaft 59. This rotational movement tends to compress the springs 60 through 64, inclusive, which are wound around the rods 47 through 51, inclusive, and the compression of the springs in turn tends to push the rods 47 through 51, inclusive, towards the plates 65 through 69, inclusive. Plates 65 through 69, inclusive, are separated from the rods 47 through 51, inclusive, in the normal position but when the rods are pushed towards the plates, contact is attained between these plates and the plates 70 through 74, inclusive, which are respectively attached to but insulated from the rods 47 through 51, inclusive. Electrical connections are made to the plates 65 through 69, and 70 through 74, inclusive, such that when contact is maintained between any of the plates 70 through 74, inclusive, and the corresponding plates 65 through 69, inclusive, information relative to the outgoing code is able to be transmitted. Thus, the plates 65 through 69 serve together with the plates 70 through 74 as output register relays. The electrical connections beyond the plates 65 through 69, inclusive, are not shown in the diagrams. However, for any card selected, coded information will be transmitted from only two of the five plates, since the rods associated with the other three plates are locked by the male latches engaging the female latches on the rods. Thus, for example, in Figs. 1 and 2, where the rods 47, 49 and 50 are locked when the card 23 is raised, only rods 48 and 51 are able to move towards the plates 66 and 69, respectively, when the magnet 57 is energized and thus only the plates 66 and 69 will be able to transmit an outgoing code.

It should be noted that the features shown in Figs. 1 and 2 represent only one set of cards and that in a system having a plurality of cards, a number of similar sets must be used, with each set having the mechanical features shown in Figs. 1 and 2. Additionally, it should be noted that as many sets of contact bars and associated parts may be controlled by each card as are necessary to perform the desired functions.

Figure 3:
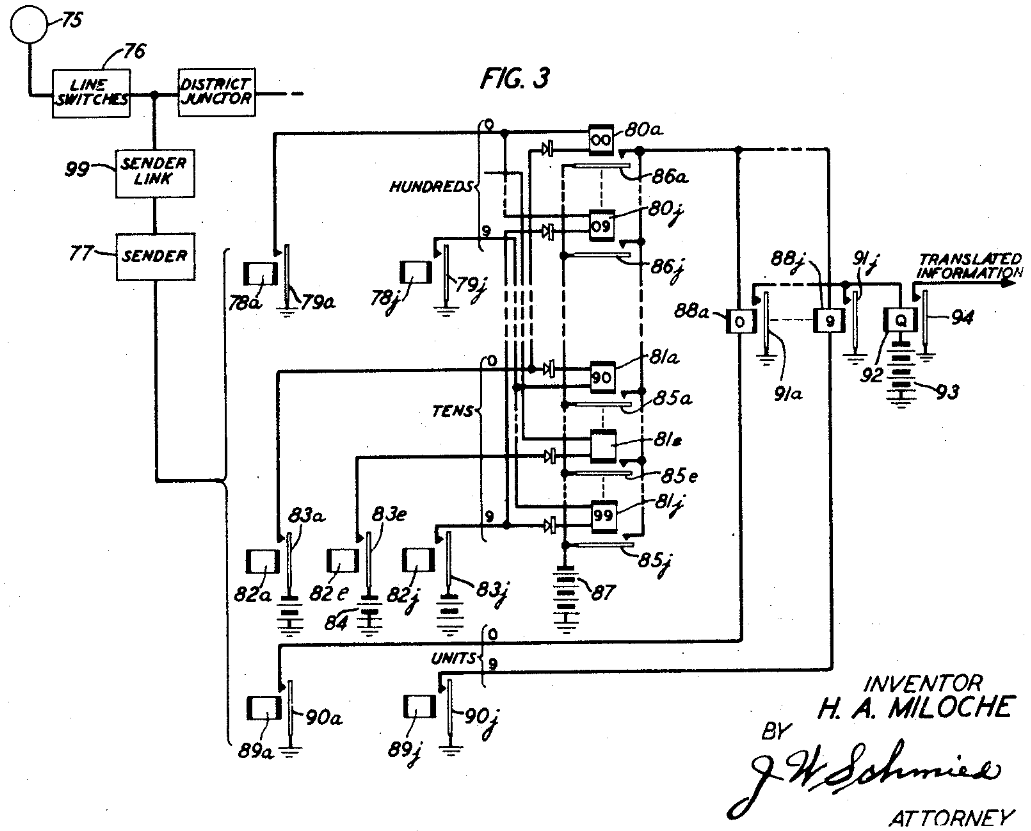
Fig. 3 is a simplified circuit diagram of the electrical features of the invention.

Referring now to Fig. 3, a simplified circuit diagram is shown of the electrical features of the invention. From the subscriber's telephone 75, the call is routed through appropriate line switches 76 and sender links into the sender 77, into which the subscriber proceeds to dial the number he is calling. The following discussion will proceed on the theory that the code consists of three digits, as in the present telephone system, but a different number of digits could be used. If a different number of digits were used, the circuit used would be essentially the same as that shown in Fig. 3 except that it would be expanded to deal with the additional digits of the code number. Likewise, only ten possible values are assumed for each digit, as in the present telephone system, but the circuit could be expanded to accommodate any number of possible values for each digit. Thus, when the first number, corresponding to the "hundreds" digit of a three-digit code number, is dialed, the sender 77 selects one of the 10 relays 78*a* through 78*j*, inclusive, and actuates this relay, the particular relay being selected depending upon the number that is dialed. When the relay is actuated, it closes on of the contacts 79*a* through 79*j*, inclusive, with the contact that is closed corresponding to the relay that is actuated. The closing of the contact allows a continuous circuit to be established to one side of ten magnets. Thus, for example, if the first number dialed is "0," a continuous circuit will be established to one side of each of the magnets 80*a* through 80*j*, inclusive, by reason of the actuation of the relay 78*a* and the resultant closing of the contact 79*a*. Likewise, if the number first dialed is "9," the sender will actuate relay 78*j*, which in turn will cause contact 79*j* to close and thus establish a continuous circuit to one side of each of the magnets 81*a* through 81*j*, inclusive. It will be noted that whereas one side of the contacts 79*a* through 79*j*, inclusive, connects to certain of the magnets, the other side of these contacts is connected to ground. It will be further noted that the magnets 80*a* through 80*j*, inclusive, and 81*a* through 81*j*, inclusive, correspond to the magnet 14 shown in Fig. 1.

The second number dialed, corresponding to the "tens" number of the code number, will perform similar functions to that performed by the first number dialed. When the second number is dialed, the sender 77 selects one of the 10 relays 82*a* through 82*j*, inclusive, and actuates this relay, the particular relay being selected depending upon the number that is dialed. When the relay is actuated, it closes a corresponding contact, which may be one of the contacts 83*a* through 83*j*, inclusive, and this in turn establishes a continuous circuit to one side of ten of the magnetizing relays. However, this continuous circuit will be established to only one magnet from each of the original groups of magnets responsive to the first number dialed. Thus, for example, if the second number dialed is "5," a continuous circuit will be established to one side of the magnets 80*e* and 81*e* in the groups shown in Fig. 3 and also to the fifth magnet of each of the other eight groups that are not represented in Fig. 3. This continuity is established to the other side of the magnets from that which may be established when the "hundreds" digit is dialed. It will thus be seen that although ten magnets have a continuous circuit established to one side of the magnets when the "hundred" digit is dialed and ten more magnets when the "tens" digit is dialed, only one of these magnets will have continuity established to both of its sides so that an excitation current may flow through the magnet. For example, if the first two numbers dialed are "9" and "5," continuity will be established to one side of magnets 81a through 81j, inclusive, by the action of the number "9" and, in like manner, continuity will be established by the action of the number "5" to one side of magnets 80e and 81e and also the fifth relay from the other eight groups which are not shown. But it will be seen that the magnet 81e will be the only magnet having continuity established to both sides. Since the contacts 79j and 83e have been closed by the relays 78j and 82e, respectively, and since the contact 83e is connected to the battery 84 while the contact 79j is connected to ground, an electromotive force will be established from the battery 84 through the contact 83j, the magnet 81e and the contact 79j back to the ground side of the battery 84. The resulting excitation current through the magnet 81e will close the contact 85e which is associated with the magnet 81e. This contact, together with the contacts 86a through 86j, inclusive, associated with the magnets 80a through 80j, inclusive, and the contacts associated with each one of the other magnets, is connected to one side of the battery 87, the other side of which is grounded.

Associated with each of the magnets, represented in part by the magnets 80a through 80j, inclusive, and 81a through 81j, inclusive, are 10 additional magnets. The ten magnets associated with the magnet 81a are represented by the magnets 88a through 88j, inclusive, these magnets performing the same functions as the magnets 11a through 11j, inclusive, which are shown in Fig. 1. When the first two digits of the three-digit code are dialed, the contact associated with a particular magnet that performs the same functions as the magnets 80a through 80j or 81a through 81j is closed, and thus a continuous circuit is established from the battery 87 to one side of the ten magnets which are tied in with the actuated magnet. Thus, for example, if the first two digits dialed are "95," magnet 81e will be actuated, closing the contact 85a and establishing a continuous circuit from the battery 87 to one side of the magnets 88a through 88j, inclusive, which are associated with the magnet 81e. This action will prepare the magnets 88a through 88j, inclusive, for the action that results when the third digit is dialed. The action that results when the third digit is dialed is similar to that which ocurred on the magnets 78a through 78j and contacts 79a through 79j when the first number was dialed, and on the magnets 82a through 82j and contacts 83a through 83j when the second number was dialed. Consequently, it will be seen that one of the magnets 89a through 89j, inclusive, will be actuated depending upon the value of the third digit that is dialed and this relay will cause the corresponding contact to close from among the contacts 90a through 90j, inclusive. Since the contacts are connected to ground on one side, a continuous circuit will be established from the battery 87 through one of the magnets 88a through 88j, inclusive. For example, if, after the numbers "9" and "5" have been dialed, the number "6" is dialed, magnet 89f will be actuated, closing contact 90f. Thus, a continuous circuit will be established from the battery 87 through the magnet 88f and the contact 90f back to the ground side of the battery 87. The magnet 88f will thus have an excitation current flowing through it and will cause the associated contact 91f to close and perform the functions of magnet 11f shown in Fig. 1.

The contact 91f, as well as the other contacts 91a through 91j, inclusive, is connected in series with the magnetizing relay 92 and the battery 93. One side of the battery is connected to ground, as is one side of the contacts 91a through 91j, inclusive. Thus, proceeding on the assumption of the previous paragraph that magnet 89f has been actuated, a completed circuit will be established from the battery 93 to the magnet 92 and the contact 91f, which is closed because of the action of the magnet 88f. The magnet 92 is thus actuated, performing the functions of magnet 57 shown in Fig. 1. As described in Fig. 1, certain contacts corresponding to the notched positions on the cards are closed and, as a result, outgoing information may be transmitted. The closing of the contact 94 in Fig. 4 represents the closing of these last contacts, as described in connection with Fig. 1.

Although only certain embodiments have been described in the preceding discussion, it is to be understood that various other embodiments and applications thereof may be made by those skilled in the art without departing from the spirit of the invention and the scope of the appended claims.

What is claimed is:

1. A translator comprising a plurality of input registers, a plurality of output registers, a plurality of stacked cards grouped in a plurality of sets, means under the control of certain of said input registers to select any one of said sets of cards, means under the control of other input registers to select any card of said selected set, means controlled by the selected card of the selected set for operating said output registers, means for restoring said selected card to said set, and further means for restoring said set after each operation.

2. A translator comprising a plurality of input registers, a plurality of output registers, a plurality of stacked cards grouped in a plurality of sets, each card in a set having a distinctive pattern of irregularities along an edge, means under the control of certain of said input registers to select any one of said sets of cards, means under the control of other of said registers to select a card in the selected set by the pattern of irregularities along the edge, means controlled by the selected card in the selected set to operate certain of said output registers, means for restoring said selected card to said set and further means for restoring said set to normal after each operation.

3. A translator comprising a plurality of input registers, a plurality of output registers, a plurality of stacked cards grouped in a plurality of sets, each card in a set having a distinctively positioned protrusion along a first edge and a distinctive pattern of irregularities along a second edge, means under the joint control of certain of said input registers to select any one of said sets of cards, means under the control of other of said registers for selectively displacing any of said cards in said selected set by operation upon said protrusion, means cooperating with irregularities along the second edge of said displaced card to operate certain of said output registers, means for restoring said displaced card to said selected set, and further means for restoring said selected set to normal after each operation.

4. A translator comprising a plurality of input registers, a plurality of output registers, a plurality of stacked cards grouped in a plurality of prearranged sets, each card in a set having a tab extending from one edge at a position along the edge different from the other cards in the set, each of said cards having a plurality of distinctively positioned irregularities along the opposite edge from said tab, means under the joint control of certain of said registers to select any of said sets of cards, means under the control of other registers to selectively displace a card in each selected set by operation upon a particular tab along the first edge, means controlled by the irregularities along the opposite edge of said displaced card to operate certain of said output registers, means for restoring said displaced card to its normal position within said set, and further means for restoring said selected set to its normal unselected condition after each completed operation.

5. A plurality of cards arranged in stacked relation, a distinctively positioned protrusion along a first edge of each card, a distinctive pattern of irregularities along the opposite edge of each card, means for selectively displacing any one of said cards by operation upon the distinctively positioned protrusion along the first edge, and means for effecting an output registration from the distinctive pattern of irregularities along the opposite edge of said displaced card.

6. A plurality of cards arranged in stacked relation, a tab extending from one edge of each card such that when the cards are aligned each tab protrudes at a different point, indentations on the opposite edge of each card arranged in a distinctive pattern for each card in the set, means adjacent to each tab for pushing on the tab and selectively displacing the card associated with the tab, a plurality of members transversely positioned with respect to said stacked cards and adjacent said indented edges, each of said transverse members having a latch portion adapted for engagement with a corresponding latch member interposed between said transverse members and said card, output registering means associated with each of said transverse members such that selective displacement of certain of said cards by operation upon said tab causes certain of said transverse members to be locked against movement by the displacement of said cards and other of said transverse members aligned with indented portions of said displaced cards are freed to operate said associated output registering means.

7. A plurality of cards arranged in a number of sets, an input register associated with each set, each of the cards in a set having a tab extending from one edge at successive positions along the edge, first mechanical means under each tab in a set, further mechanical means located between each of said tabs and said first mechanical means but disaligned with respect to said tabs and first mechanical means, means for aligning said second mechanical means with said first mechanical means and the tabs in a set upon the operation of an input register and thus selectively rendering the cards in the set available for further selection, and input registers for operating on said first and second mechanical means to displace one of the cards in the set.

8. A plurality of cards arranged in a number of sets, an input register associated with each set, each of the cards in a set having a tab extending from one edge at successive positions along the edge, a yoke in juxtaposition to each tab in a set, a pin adjacent to each yoke in the set but disaligned with respect to its respective tab and yoke, a selecting bar adjacent to each pin and in alignment with its respective yoke and tab, means associated with said input registers for aligning said pins with said yokes and rods upon the operation of an input register, thus selectively rendering the cards in a set available for further selection, and further input registers for operating on said yokes, pins and bars to displace one of the cards in the set.

9. A plurality of stacked cards arranged in separate groups, each of said cards in a group having a distinctively positioned protrusion along a first edge, mechanical coupling means in juxtaposition to each protrusion in a group, mechanical selecting members adjacent to but disaligned with respect to each of said coupling means, first electromagnetic means associated with each group, said selecting members of each group movable into alignment with said adjacent coupling means upon operation of said corresponding first electromagnetic means associated with said group, further electromagnetic means associated with each one of said selecting members and operable subsequent to operation of said first electromagnetic means to selectively displace any card of said group, a plurality of coded irregularities in a distinctive pattern along a second edge of each of said cards, a plurality of latch members adjacent said second edge of said displaced card, certain of said latch members engaging with protruding irregularities of said card, output registering means associated with each of said latch members, said registering means associated with disengaged latch members operable upon energization of a third electromagnetic means, and said registering means associated with latch members engaged by irregularities of said displaced card being restrained from operation.

10. A plurality of cards arranged in sets, means for selectively displacing a particular card in a selected set, a plurality of notches on one edge of said card, a plurality of yokes encompassing each set of cards located in juxtaposition to said edges such that certain of the yokes are located adjacent to said notches, a male latch portion attached to each of said yokes, a contact rod located adjacent to each yoke, female latch portions on each contact rod in alignment with the male latch portion of the yoke, output register relays operable by each of said contact rods, said selected card operating when displaced to prevent said selecting bars from moving by locking said male latch portions with said female latch portions, leaving only the rods adjacent to notches free to operate.

11. A plurality of input registers having two terminals each, said registers arranged in first groupings, means for establishing continuity to one terminal of each of the registers of a particular group, said registers arranged in second groupings such that each of said second groupings will contain only one register from each of said first groupings, means for establishing continuity to the second terminal of each of the registers in a particular second grouping whereby only one register will have continuity established to both of its terminals, a plurality of cards arranged in separate sets associated with each of said registers, said selected register operating to make its associated cards available for further operation, an input register associated with each card of the selected set, and means for operating a particular input register whereby a particular card is selected for purposes of output registration.

12. A translator arrangement comprising a plurality of input registers, a plurality of output registers, a plurality of stackable cards arranged in a plurality of sets, each card in a set having a tab extending from the bottom edge at a position along the edge different from the other cards in the set, a separate bar lying under each of said tabs, each card in the set having a number of notches along the top edge of the card, means under the joint control of certain of said registers to condition one of said sets of cards to be engaged by said bars, means under the control of other registers to select a card in each set by the operation of a bar under the tab along the bottom edge, said means operating to lift the bar located under the set of cards at the place where the selected card has the tab and thus operating to lift the card also, and means employing the notches along the top edge to render only the selected card in the selected set effective to operate said output registers.

HERMAN A. MILOCHE.

REFERENCES CITED

The following references are of record in the file of this patent:

UNITED STATES PATENTS

| Number | Name | Date |
|---|---|---|
| 1,870,547 | Wise | Aug. 9, 1902 |
| 1,651,180 | Bryce | Nov. 29, 1927 |
| 2,361,246 | Stibitz | Oct. 24, 1944 |
| 2,361,859 | Mallina | Oct. 31, 1944 |